US012730037B2

(12) United States Patent
Brettle et al.

(10) Patent No.: US 12,730,037 B2
(45) Date of Patent: Sep. 8, 2026

(54) TEST SLIDES AND METHODS OF PRODUCTION IN STAIN ASSESSMENT

(71) Applicants: LEEDS TEACHING HOSPITALS NHS TRUST, Leeds (GB); UNIVERSITY OF LEEDS, Leeds (GB)

(72) Inventors: David Brettle, Leeds (GB); Darren Treanor, Leeds (GB); Catriona Marie Dunn, Leeds (GB)

(73) Assignees: LEEDS TEACHING HOSPITALS NHS TRUST, Leeds (GB); UNIVERSITY OF LEEDS, Leeds (GB)

(*) Notice: Subject to any disclaimer, the term of this patent is extended or adjusted under 35 U.S.C. 154(b) by 782 days.

(21) Appl. No.: 17/921,846

(22) PCT Filed: Apr. 28, 2021

(86) PCT No.: PCT/EP2021/061096
§ 371 (c)(1),
(2) Date: Oct. 27, 2022

(87) PCT Pub. No.: WO2021/219702
PCT Pub. Date: Nov. 4, 2021

(65) Prior Publication Data
US 2023/0175935 A1 Jun. 8, 2023

(30) Foreign Application Priority Data
Apr. 28, 2020 (GB) ..................................... 2006257

(51) Int. Cl.
*G01N 1/31* (2006.01)

(52) U.S. Cl.
CPC .................................... *G01N 1/312* (2013.01)

(58) Field of Classification Search
CPC ................................. G01N 1/31; G01N 1/312
See application file for complete search history.

(56) References Cited

U.S. PATENT DOCUMENTS 5,109,429 A 4/1992 Bacus et al.
5,610,022 A 3/1997 Battifora
6,281,004 B1 8/2001 Bogen et al.
7,057,735 B2 6/2006 Jasapara
7,598,036 B2 10/2009 Chu
7,667,890 B2 2/2010 Maenle et al.
7,695,752 B2 4/2010 Bonner et al.
9,454,691 B2 9/2016 Revie et al.
10,082,451 B2 9/2018 Chen et al.
10,241,310 B2 3/2019 Gouch et al.
10,921,223 B2 2/2021 Husher et al.
11,002,667 B2 5/2021 Boamfa et al.
11,300,485 B2 4/2022 Husher et al.
11,408,821 B2 8/2022 Boamfa et al.
2003/0166261 A1 9/2003 Sompuram et al.
2004/0102903 A1 5/2004 Graessle et al.
2006/0051736 A1 3/2006 Shields et al.
2008/0070324 A1* 3/2008 Floyd ............... G01N 33/54393
422/400
2015/0031051 A1 1/2015 Mohan et al.
2015/0178948 A1 6/2015 Schnier et al.
2016/0123850 A1 5/2016 Revie et al.
2018/0003935 A1 1/2018 Lim
2019/0094116 A1 3/2019 Cheng et al.
2019/0345439 A1 11/2019 Skardal et al.
2020/0209600 A1 7/2020 Chen et al.
2020/0292536 A1 9/2020 Hotzel et al.
2020/0316589 A1 10/2020 Genty
2022/0003639 A1 1/2022 Roessler
2022/0043251 A1 2/2022 Moore et al.
2022/0091307 A1 3/2022 Abbey et al.
2022/0091407 A1 3/2022 Abbey et al.
2022/0138939 A1 5/2022 Jalali et al.
2023/0013775 A1 1/2023 Chen et al.

FOREIGN PATENT DOCUMENTS

CN 103471898 A 12/2013
EP 1 950 595 A1 7/2008
EP 3 065 704 B1 3/2019
EP 3 004 847 A1 4/2019
(Continued)

OTHER PUBLICATIONS

Emily Clarke et al., *Development of a Novel Tissue-Mimicking Color Calibration Slide for Digital Microscopy,* Color Research & Application, vol. 43, No. 2, Oct. 9, 2017, pp. 184-197, XP055822969.
Catriona Dunn et al., *The Use of a Biopolymer Film for Quantitative H&E Stan Assessment and Quality Control in Pathology,* NHS The Leeds Teaching Hospitals, NHS Trust, Oct. 2022 (Pathology Visions 2022, Las Vegas), p. 1.
Nagajyothi et al., *Response of Adipose Tissue to Early Infection With Trypanosoma Cruzi* (Brazil Strain); The Journal of Infectious Diseases, vol. 205, pp. 830-840. (Year: 2012).
Yagi, Y. *Color Standardization and Optimization in Whole Slide Imaging;* Diagnostic Pathology, vol. 6, Suppl. 1, pp. 1-12. (Year: 2011).
(Continued)

*Primary Examiner* — Brian Gangle
*Assistant Examiner* — Lakia J Jackson-Tongue
(74) *Attorney, Agent, or Firm* — Workman Nydegger

(57) ABSTRACT

A QA test slide for use in a stain QA method for a stain and method of making QA test slides are described. The QA test slide comprises: a transparent substrate; a piece of biopolymer material mounted on the transparent substrate; and a sticker defining an aperture and adhered to the transparent substrate over the piece of biopolymer material and with a portion of the piece of biopolymer material exposed by the aperture and wherein a machine readable code is borne by the sticker and the machine readable code encodes a unique identifier for the QA test slide.

31 Claims, 9 Drawing Sheets

(56) References Cited

FOREIGN PATENT DOCUMENTS

| | | | | |
|---|---|---|---|---|
| EP | 3 521 893 | A1 | | 8/2019 |
| EP | 3 640 702 | A2 | | 4/2020 |
| EP | 2 904 373 | B1 | | 12/2022 |
| WO | 1998/057748 | A1 | | 12/1998 |
| WO | 2001/46671 | A1 | | 6/2001 |
| WO | WO 01/46671 | A1 | * | 6/2001 |
| WO | 2009/085573 | A2 | | 7/2009 |
| WO | 2013/186530 | A1 | | 12/2013 |
| WO | 2014/165327 | A1 | | 10/2014 |
| WO | WO2018228576 | A1 | * | 12/2018 |
| WO | 2022/233684 | A1 | | 11/2022 |
| WO | 2022/259810 | A1 | | 12/2022 |

OTHER PUBLICATIONS

International Search Report dated Jul. 19, 2021, issued in PCT Application No. PCT/EP2021/061096, fled Apr. 28, 2021.

Emily L. Clarke et al., *Development of a Novel Tissue-Mimicking Color Calibration Slide for Digital Microscopy,* Wiley Periodicals, Inc., 2017, pp. 184-197.

* cited by examiner

400

| | | B | W | R | G | B |
|---|---|---|---|---|---|---|
| 402 | $R_{RUF}$ | $R^{B}_{Ref}$ | $R^{W}_{Ref}$ | $R^{R}_{Ref}$ | $R^{G}_{Ref}$ | $R^{B}_{Ref}$ |
| 404 | $R_{Measured}$ | $R^{B}_{M}$ | $R^{W}_{M}$ | $R^{R}_{M}$ | $R^{G}_{M}$ | $R^{B}_{M}$ |

TEST SLIDES AND METHODS OF PRODUCTION IN STAIN ASSESSMENT

BACKGROUND OF THE INVENTION

1. The Field of the Invention

The present invention relates to staining tissue and in particular to methods and apparatus for use in relation to the assessment of the staining of samples.

2. The Relevant Technology

Staining is generally used in microscopy to enhance the contrast of different features visible in the image of a stained sample. Staining may be used in both optical microscope and also digital microscopy, in which the stained slide is scanned and then a computer used to view the digital image of the slide.

Various types of sample material may be stained including various biological materials such as plant or animal tissue or cells.

Various types of stains and dyes are generally known in the art and different ones may be chosen depending on the type or material being stained. Common and well known examples of stains, include Haematoxylin and eosin (H&E), which is frequently used in histology, Masson Trichrome, Papanicolaou, Periodic acid schiff, and many others generally known by persons of ordinary skill in the art.

Generally speaking, the process of preparing a sample includes obtaining the tissue or cells, fixation and any other processing of the material, embedding, for example in a paraffin block and the sectioning into thin slices using a microtome or similar. Each section including the material is then mounted on a microscope slide, typically made of glass, and then the prepared slides undergo a staining protocol typically including immersion of the slides in one or more liquid stains. The stained slides can then be imaged by being viewed optically using an optical microscope or by being scanned to create digital images of the stained slides and then a computer used to display the digital slide images on a display device.

Typically the displayed images are then viewed and assessed by a skilled user, for example a pathologist, technician or a student.

As will be appreciated form the above there are a number of different stages which are involved in producing the end image and there can be some variability in each of the stages.

SUMMARY OF THE INVENTION

The present invention therefore relates to various issues that can arise from staining the material to be imaged.

A first aspect of the invention provides a QA test slide for use in a stain QA method for a stain. The QA test slide may comprise: a transparent substrate; a piece of biopolymer material mounted on the transparent substrate; and a sticker defining an aperture and adhered to the transparent substrate over the piece of biopolymer material and with a portion of the piece of biopolymer material exposed by the aperture. A machine readable code may be borne by the sticker and the machine readable code may encode a unique identifier for the QA test slide.

The transparent substrate may be a microscope slide.

The sticker may further bear a first, a second and a third reference colour patch, and wherein each reference colour patch is a different colour.

The sticker may further bear a traceability code.

The machine readable code may be a QR code.

The biopolymer material may have a thickness in the range of 1 to 40 microns.

The biopolymer material may be cellulose.

The aperture may have a dimension of between 2 cm and 0.5 cm.

The stain may be H&E. The piece of biopolymer material may be responsive to H&E.

The QA test slide may further comprise: a further piece of biopolymer material mounted on the transparent substrate. The sticker may define a further aperture and may be adhered to the transparent substrate over the further piece of biopolymer material and with a portion of the further piece of biopolymer material exposed by the further aperture. The piece of biopolymer material may be responsive to a first stain and the further piece of biopolymer material may be responsive to a second stain.

The piece of biopolymer material may be responsive to Haematoxylin and/or the further piece of biopolymer material may be responsive to Eosin.

The aperture and/or the further aperture may each have a dimension between 1.5 cm and 0.5 cm.

The piece of biopolymer material and/or the further piece of biopolymer material may have a dimension of between 2 cm and 0.5 cm.

The, or each, piece of biopolymer material may have been stained by the stain which is being, or is going to be, used to stain sample slides.

The sticker may define a further aperture arranged to permit the transmission of white light through the QA test slide.

A second aspect of the invention provides a method of making QA test slides for use in a stain QA method for a stain. The method may comprise: cutting a plurality of pieces of biopolymer material from a sheet of biopolymer material; fixing a test piece of the plurality of pieces to a microscope slide; staining said test piece using a freshly made batch of the stain; determining whether the colour of the stained test piece is sufficiently similar to a reference colour; and fixing those of the plurality of pieces cut from a region of the sheet associated with the test piece to a respective microscope slide if the colour of the stained test piece is sufficiently similar to the reference colour to form a plurality of QA test slides.

The method may further comprise: assigning a unique reference to each of the plurality of QA test slides; and adhering a respective sticker, defining an aperture therein, to a respective microscope slide and over the piece of biopolymer material fixed to the microscope slide, wherein each sticker bears a respective unique reference for the slide.

The method may further comprise storing each QA test slide in a respective container.

Each container may be an opaque container.

Each container may include a desiccant.

The container may include an external traceability label.

A spectrophotometer may be used to determine whether the colour of the stained test piece is sufficiently similar to a reference colour.

The method may further comprise cutting the sheet of biopolymer material from a production line piece of biopolymer material.

The plurality of pieces of biopolymer material may comprise a plurality of groups of pieces, and wherein: a test piece from each group is fixed to a respective microscope slide; each of said test pieces is stained using the freshly made batch of the stain; whether the colour of each of the stained test pieces is sufficiently similar to a reference colour is determined; and the rest of the pieces of the group are fixed to a respective microscope slide if the colour of the stained test piece from the group is sufficiently similar to the reference colour, for each of the plurality of groups.

Each group of pieces may comprise a plurality of pieces that have been cut from a different position within a row of positions of the sheet.

Each different position may be a different column.

The stain may be H&E.

The biopolymer material have a thickness in the range of 1 to 40 microns.

The biopolymer material may be cellulose.

Determining whether the colour of the stained test piece is sufficiently similar to a reference colour may include: measuring the colour of the stained test piece; and calculating a value for ΔE from the measured colour of the stained test piece and the reference colour.

The colour of the stained test piece may be determined to be sufficiently similar to a reference colour if the value for ΔE is not greater than one.

BRIEF DESCRIPTION OF THE DRAWINGS

Embodiments of the invention will now be described, by way of example only, and with reference to the accompanying drawings, in which.

DETAILED DESCRIPTION OF THE PREFERRED EMBODIMENTS

Similar items in the different Figures share common reference signs unless indicated otherwise.

Embodiments of various aspects of the invention will be described below within the context of Histopathology and in particular the H&E stain. However, the invention is not limited to Histopathology and can be used in a wide range of other areas in which biological materials may be stained. For example the invention may also be of use in histology, cytology, cytopathology and others generally known to persons of ordinary skill in the art. Also, the invention is not limited to the H&E stain, but can also be used in connection with other stains, including various histochemical or cytochemical stains as well as immunohistochemical stains all of which are generally known to persons of ordinary skill in the art.

Histopathology is a diagnostic technique that uses tissue samples acquired from the patient and processed so the underlying pathology can be visualised. As discussed above, this process can include cutting the tissue into thin sections (e.g., approximately 5 microns thick) and staining the sample so that the pathology can be visualised under a microscope, or by digitising in a scanner and viewing on a computer monitor. The process of producing the slide, particularly the cutting and staining, has many variables that can affect the quality of the sample including sample thickness, stain age, staining method and variability of the stain.

It has been found that stain variables can lead to a 40% variation in the final diagnostic image yet currently there is no system for accurately, reliably and consistently assessing quantifying stain quality in histopathology laboratories. This could lead to misdiagnosis using optical microscopy and also particularly with digital histopathology where stain variation can affect automated image analysis algorithms. Currently the main method of quality assurance (QA) of stain is to stain a tissue sample periodically, e.g., each day, and have a person subjectively review it for consistency. Hence, a more quantitative and objective approach to quality assurance of staining may both improve overall image quality and also help to facilitate the next generation of automated analysis tools.

Figure 1:
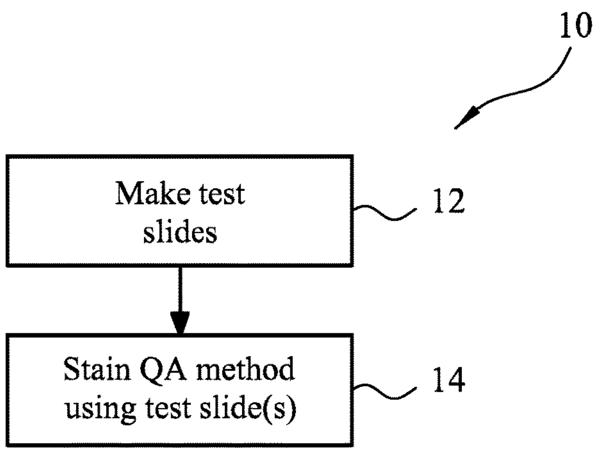
FIG. 1 shows a flow chart illustrating various method aspects of the present invention.

Various methods, systems and apparatus for implementing a method of stain QA are described below. The stain QA method described below can be used to provide routine testing and quantification of stain quality in haematoxylin and eosin (H&E), and which is used in over 90% of applications. FIG. 1 shows a flow chart illustrating an overall method of the invention 10 at a high level. Preferably the method 10 includes making special test slides 12 having various features, described in greater detail below, to allow them to be used in a quantitative and reliable stain QA method 14.

The stain QA method 14 uses a least one specially made test slide and which is stained in exactly the same way as a clinical sample and then analysed using a test slide scanner. The test slide contains one or more test patches that uptake stain proportionally to tissue but are of a known thickness so that any variation can be measured and tracked. If the stain quality as determined from an image of the test patch, or patches, is outside of control values, then the user can be alerted and the stain can be refreshed.

Figure 2:
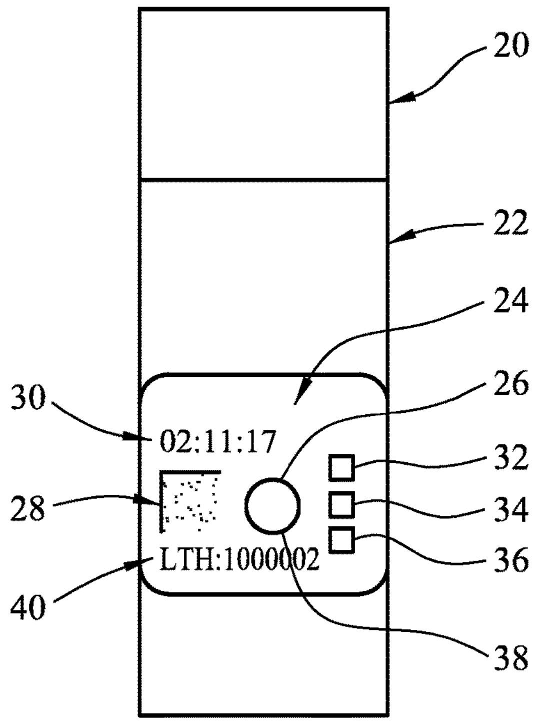
FIG. 2 shows a first embodiment of a test slide for use in a stain quality assurance method according to an aspect of the invention.

FIG. 2 shows a first embodiment of a test slide 20 according to the invention. The test slide 20 comprises a transparent substrate 22 in the form of a glass microscope slide. A label or sticker 24 made from Polyethylene terephthalate (PET) or polyester is adhered to an upper surface of the slide 22. The sticker 24 defines a generally circular aperture 26 and bears a machine readable code 28 on an outermost surface. Machine readable code 28 encodes various data items, described in greater detail below, and including at least a unique identification number, or other unique identifier, for the test slide 20. In the illustrated embodiment, the machine readable code is in the form of a QR code, as generally known in the art, although in other embodiments, other machine readable codes may be used, such as a bar code or similar. Sticker 24 also bears indicia 30 signifying a date of manufacture of the test slide 20. Sticker 24 also bears a first 32, second 34 and third 36 reference colour patch. In the illustrated embodiment, the first patch is red, the second patch is green and the third patch is blue and they are each in the form of a piece of coloured vinyl.

A disc of biopolymer material is fixed to the upper surface of the glass slide 22 and sandwiched between the sticker 24 and the glass slide. A circular portion or patch 38 of the disc is exposed by the circular aperture 26 formed by the sticker 24. In the illustrated embodiment, the disc of biopolymer material may have a thickness of approximately 24 microns, a diameter of approximately 10 mm and the aperture 26 may have a diameter of approximately 6 mm. Also, in the illustrated embodiment, the test slide 20 has already been subject to an H&E staining protocol and the biopolymer material has been stained a generally purple colour. Hence, the stained test slide 20 is ready for processing as part of the quantitative stain QA method 14.

Suitable materials for the biopolymer material include cellophane, cellulose, agar, agarose and gelatin. It has been found that cellulose is a particularly suitable material for the biopolymer material as it has a generally linear absorption response to the Haematoxylin stain and Eosin stain as a function of time. Other suitable biopolymer for other stains include cellophane, cellulose, agar, agarose and gelatin and which may be doped with different materials, such as Chitosan, for example, to vary the response. Other stains that may be used include, by way of non-limiting examples, Diaminobenzidine (DAB) with Haematoxylin counter stain, Papanicolaou (PAP), Perls' Prussian blue, Periodic acid-Schiff (PAS), Reticulin, Millers elastic Van Gieson, Shikata, Giemsa stain, Ziehl Neelsen technique, Grocott, Alcian blue PAS, Jones methenamine silver, Gram, Congo red stain for amyloid and Masson trichrome. Generally, the biopolymer material provides an artificial analog for the biological material of the tissue or cell sample actually being stained.

Sticker 24 also includes a test slide traceability code 40 in human readable form so that a person running a test can read and sort slides without the need to use a machine.

Figure 3:
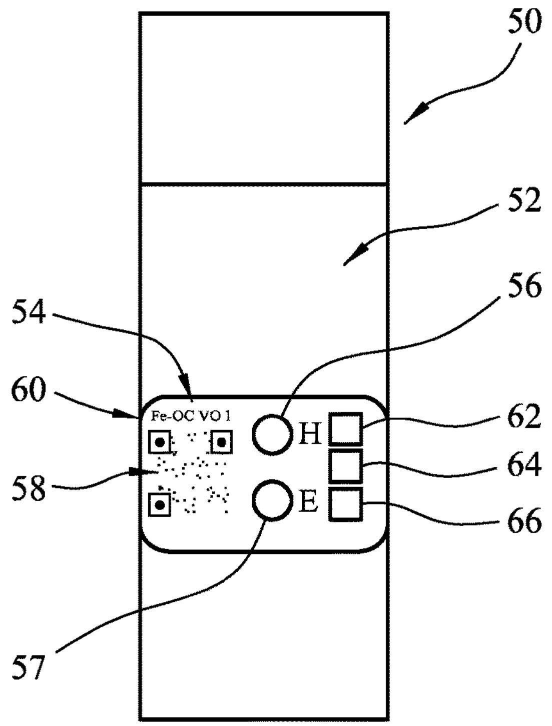
FIG. 3 shows a second embodiment of a test slide for use in a stain quality assurance method according to an aspect of the invention.

FIG. 3 shows a second embodiment of a test slide 50 according to the invention. Test slide 50 is generally similar to test slide 20 in that it includes a glass microscope slide substrate 52, and a sticker 54 bearing a machine readable code 58, and first 62, second 64 and third 66 colour patches in the form of red, green and blue coloured pieces of vinyl. Sticker 54 defines a first circular aperture 56 and a second circular aperture 57 each exposing a respective circular patch of biopolymer material sandwiched between the sticker 54 and an upper surface of glass slide 52.

The first patch of biopolymer material is adapted to be stained by Haematoxylin and the second patch of biopolymer material is adapted to be stained by Eosin. Each exposed patch of biopolymer material has a diameter of approximately 5 mm. The H patch 56 is made from cellulose and the E patch 57 is made from chitosan doped cellulose to bias for Eosin uptake, although other dopants may also be used.

The sticker 54 may also include a test slide traceability code 60 in human readable form As explained in greater detail below, the red, green and blue colour patches 32, 62, 34, 64, 36, 66 are optional and may be omitted in some embodiments of the test slide.

In order to ensure reliability and consistency of the results of the stain QA method, there needs to be consistency between the test slides used in the stain QA method. Hence, care needs to be taken in the manufacture of the test slides to try and reduce any significant variations in the stain QA method arising from materials properties of the biopolymer material used in the test slides, such as composition and thickness. Hence, a method of manufacturing the test slides 12 has been developed.

Figure 4:
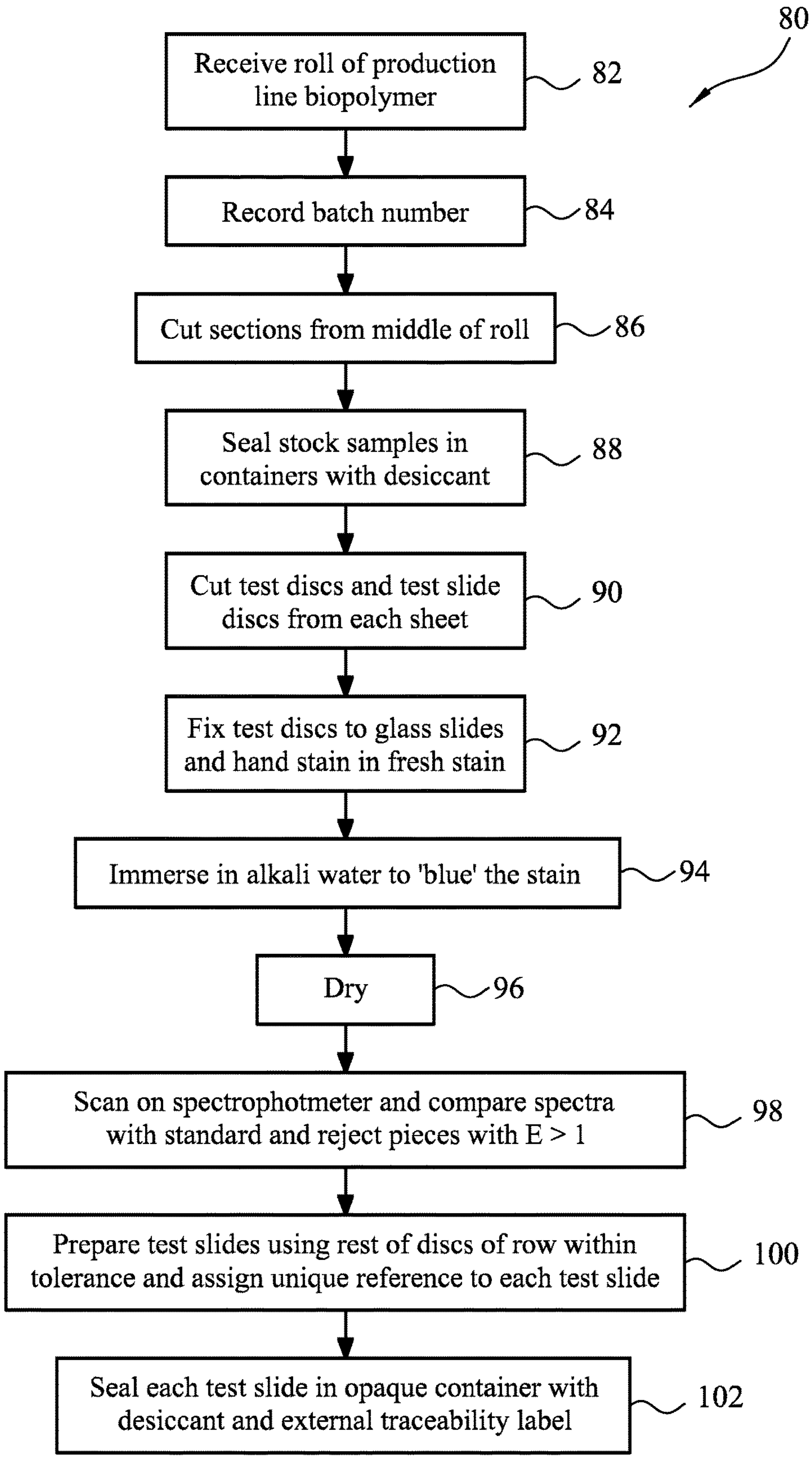
FIG. 4 shows a flow chart illustrating a method of making test slides for use in a stain quality assurance method according to an aspect of the invention.

FIG. 4 shows a flow chart illustrating a method 80 of making the test slides 20, 50 for use in the stain QA method 14.

The inventors have found variability in stain uptake by biopolymer materials and which can equate to a colour distance or difference, ΔE, of approximately 2 and hence perceptible to the human eye. The origin of this variability is currently uncertain but may be to one or more of the manufacturing process, thickness variation, storage of the material (potentially absorption of moisture) and possible contaminants.

It is currently not possible accurately to control the manufacture process due to its large-scale industrial nature. However, by selecting and grading sheets of biopolymer material an acceptable level of tolerance less than 1 ΔE (the minimum level of perception) can be achieved.

Initially a source of production line biopolymer material potentially suitable for use in the test slides is available. Then at 82 a roll of production line cellulose film having a nominal thickness of 24 microns is received and the batch number for the roll of cellulose film is received form the manufacturer and recorded at 84. At step 86 stock is taken from the roll of cellulose film by cutting approximately A4 size sections or sheets from the middle portion of the roll of film. At step 88, the stock samples are sealed into containers, such as zip lock bags, with desiccant on the same day as the day of manufacture to avoid or reduce any the absorption of moisture. These steps of the method can be carried out at the manufacturing site of the biopolymer film. The containers of stock samples can then be transported to the site of manufacture of the test slides, if different to the site of manufacture of the biopolymer film.

At 90, one or more sheets of biopolymer film may be removed from their container and each sheet is subsampled by cutting approximately 1 cm diameter discs from a middle 5 cm wide portion of each A4 sheet in portrait orientation, at approximately 1 cm horizontal intervals and approximately 2 cm vertical intervals. The disk size is typically 1 cm for ease of manufacture and adhesion but can vary. The aperture size in the label can also vary depending on utility. The difference in FIGS. 2 and 3 is that in order to fit more discs the size had to be reduced slightly. The main considerations are that the disc is large enough to allow adhesion, and the aperture is large enough to allow adequate statistics. This seems to be facilitated with a disc with diameter about 1 cm and an aperture with a diameter of about 6 mm-8 mm. Hence, a plurality of discs from an array of positions are obtained, the position of each disc within the arrays is defined by a row number and a column number within each row. The disc of material from the first column of each row is used as a test piece, and the discs of material from the remaining columns of each row are reserved for use as potential test slide discs.

In an alternative embodiment, a reasonably narrow strip of film, for example 30 mm to 40 mm wide from the centre, or some other fixed position, of the roll of film may be used to try and control consistency.

At 92, each test disc is fixed to a respective glass microscope slide using a printed label or sticker. A unique identifier for each test slide, and any other data related to the slide, may be entered into a software application which generates an appropriate QR code which is then printed on the sticky label together with any other relevant data. The test disc is placed on the slide and then fixed in placed by overlaying the sticky label with the test disc being exposed through the aperture defined in the label.

Then at 93 each test slide is either hand stained or automatically stained in fresh batch of the appropriate stain. For example, if the test slide is intended to be used use Haematoxylin stain, then the test disc is stained in a fresh batch of Mayers Haematoxylin for approximately 3 minutes. The stained test discs are then immersed in Scotts tap solution (alkali water) at 94 for approximately 2 minutes to 'blue' the stain. The test discs and the left on a drying rack for approximately 90 minutes to dry at 96. As will be appreciated by a person of ordinary skill in the art, other specific H&E staining protocols may be used instead, and indeed other stains.

Then, at 98 each stained test disc is scanned on a spectrophotometer and a spectrum for each test disc is compared with a base line standard spectrum stored on the spectrophotometer. The base line standard defines the ideal spectrum that the test disc should have in order to correspond to an ideal test slide. The spectrophotometer may capture R, G and B values for the test disc and then convert those into L, A and B values for a LAB colour space. A value for $\Delta E$ may then be calculated by the spectrophotometer from the LAB values for the test disc and the LAB values for the base line spectrum. At 98, any test disc that has $\Delta E$ greater than 1 are excluded. The discs of biopolymer material from the same row as the excluded test disc are then rejected as likely also giving rise to perceptible differences when stained.

Then at 100, those discs from the same row as test pieces which were not rejected at 98 are used to make test slides. Each test slide is assigned it owns unique reference number or other unique identifier. The unique reference number for a test slide is associated with the batch number for the material, which was recorded at 84, a sheet number identifying the sheet that the disc, or discs, was cut from, a date of production of the test slide, the position on the sheet of the disc, or discs, (in terms of row and column values) and the LAB values for the corresponding test disc. The association may be made in hard copy form and/or may be made in soft copy form, for example by being entered into a record for the test slide in a database. The unique reference number may be converted into a QR or bar code using software and then the QR or bar code printed onto the sticker together with the slide traceability code similarly to as described above.

The disc, or discs, of biopolymer material are then fixed to the glass microscope slide using the printed sticker which is adhered to the glass slide over the disc or discs of biopolymer material so that an area, or areas, of the biopolymer material is or are exposed by the aperture or apertures in the sticker. At 102, each completed test slide is then sealed in an opaque container, to prevent light from affecting the biopolymer material, and including desiccant. A suitable container includes a Mylar heat sealable zip lock bag. An external traceability label bearing the traceability number or identifier for the test slide may be attached to the container. The test slides should have a shelf life of approximately 3 months.

Having describe the method of making test slides, corresponding generally to step 12 in FIG. 1, the use of such test slides in a stain QA method, generally corresponding to step 14, will now be described in greater detail with reference to FIG. 5 in particular.

Figure 5:
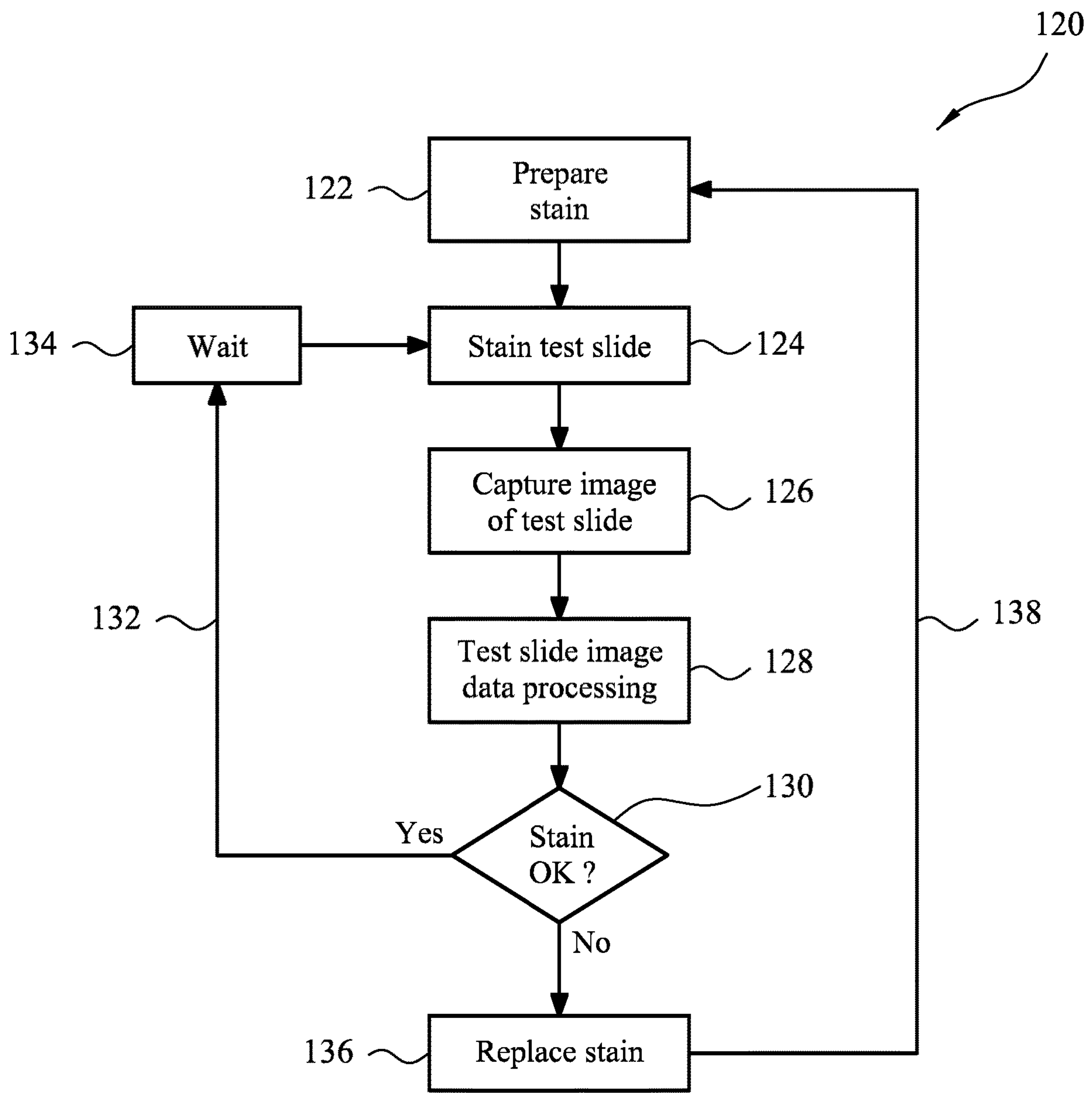
FIG. 5 shows a flow chart illustrating a stain quality assurance method according to an aspect of the invention.

FIG. 5 shows a flow chart illustrating a stain QA method 120 according to the invention. The stain QA method uses the test slides as described above. At some stage a stain has been prepared 122 for use by the facility, typically a laboratory, that prepares the sample slides including the biological material sample to be viewed. For example a H&E stain may have been prepared at some stage, for example at the start of the first day of a working week. At some stage at least one test slide is stained 124 using the stain and the same staining protocol as that used for staining the sample slides. The test slide may be stained at 124 on its own or may be stained together with one or more sample slides that are being prepared. After the test slide, and any sample slides, have been stained at 124, then an image of the test slide is captured at 126. The image of the test slide may be captured in a variety of ways, for example using a spectrophotometer, a whole slide imager (WSI), a general purpose scanner or a bespoke test slide scanner. In particular, in some embodiments, the bespoke test slide scanner described in greater detail below is used to capture the image of the test slide at 126.

As explained above, the test slides include a carefully controlled test piece of biopolymer material and which is stained by the stain at 124. Hence, at 126, the captured image of the test slide captures colour information about the colour of the stained piece of biopolymer material. At 128, at least the portion of the captured image including colour information of the stained test patch is subject to data processing to obtain a quantitative measure of the colour of the stained test patch. Using the quantitative measure of the colour of the test patch, a determination can be made at 130 whether the stain is acceptable for use or not. This may be done in various different way in different embodiments. The quantitative measure may simply be compared with a threshold value to see if the stain is still acceptable or not. The quantitative measure may be compared with ranges of values to rate the current quality of the stain, e.g., good, acceptable, not acceptable. The quantitative measure may be compared with previous quantitative measure for the same batch of stain to determine a trend. For example, the trend may indicate that for the current quantitative measure, the stain is acceptable, but the stain is likely not to be acceptable soon and therefore the stain should be changed now.

If at 130 it is determined that the stain is still acceptable for further use, the method proceeds, as indicated by process flow line 132, to 134 at which the method may pause or wait for some time.

The method may wait at 134 until a next batch of sample slides are ready for staining, and then a new test slide used with the next batch of sample slides at 124.

In other embodiments, the method may wait at 134 until a next scheduled test of the stain is required. For example, a stain may be tested first thing in the morning, at midday and at the end of the day.

In other embodiments, the method may wait at 134 for a set period, so that a test of the stain is carried out periodically during the working day, for example every 2, 3 or 4 hours.

In other embodiments, the method may wait at 134 for a time which is based on the quality of the stain determined at 130. For example, if the stain is determined to be of good quality at 130, then the method may wait at 134 for 6 hours before a next test of the stain. Whereas, if the stain is determined to be of merely acceptable quality at 130, then the method may wait at 134 for 2 hours before a next test of the stain.

If at 130 it is determined that the stain is no longer acceptable for use, either because it is currently outside of acceptable tolerances or is likely to be outside of acceptable tolerances soon, then the method proceeds, as indicated by process flow line 138 back to 122, and the old stain is discarded and a new batch of stain is prepared. After the new batch of stain has been prepared, then the method can be repeated immediately with a test slide to check that the new batch of stain has been correctly prepared.

Hence, in some embodiments, the method 120 may be used simply to track the stain quality as a function of time to help assess when the satin should be changed and/or whether the stain has been correctly prepared. In that case only a test slide may be stained at step 124. This can also help avoid wasted time and/or material samples when preparing slides so as to avoid sample slides being improperly stained. In other embodiments, the test slide and sample slides may be stained at the same time and then stain quality can then associated with the sample slides. Hence, information about the stain quality may be taken into account when the sample slides are subsequently viewed and/or displayed.

Figure 6:
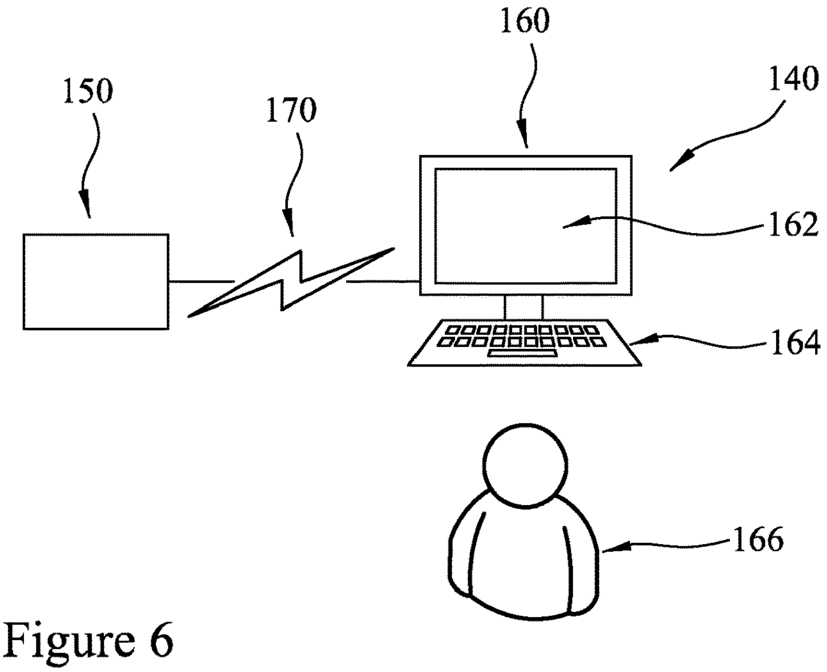
FIG. 6 shows a data processing system for use in the stain quality assurance method illustrated in FIG. 5 and according to an aspect of the invention.

A system 140 for carrying out the image capture, test slide image processing and stain quality determination parts of the method 120 is illustrated in FIG. 6. The system 140 generally includes a test slide scanner 150 and a data processing device 160. In some embodiments, the system 140 may be unitary and the scanner and the data processing device may be combined into a single device. In the illustrated embodiment, the data processing device is in the form of a general purpose computer the operation of which is configured using suitable software. As illustrated in FIG. 6, the general purpose computer includes a display device 162, in the form of a monitor, and a keyboard, 164, via which a user 166 may interact with the system. A mouse or other pointer device may also be provided. The scanner 150 is in communication with the computer 160 via a communication link 170 which may be wired or wireless. The communication link may be used to transmit data and/or control commands between the computer 160 and the scanner 150. In some embodiments, the communication link, may be in the form of a Universal Serial Bus (USB).

In other embodiments, not illustrated, the data processing device may be remote to the scanner and connected thereto over a network including a local area network or a wide area network. Hence, the scanner may collect the image data and then transmit the image data to a remote computer, such as a server connected to the scanner via the internet, and the remote computer may carry out all the scanner control and image data processing operations described subsequently. The image data and result of the data processing method may then be stored remotely on a central repository including a data base for example, and which is then remotely accessible to a client computer using a web browser or similar. Hence, in some embodiments, a combined scanner and computer may capture the image data, transmit the image data for remote processing and then receive the results of that remote processing. In other embodiments, a separate scanner and computer may be used to capture the image data, the computer may then transmit the image data for remote processing and then either the same computer or another network connected computer may receive the results of that remote processing. In other embodiments, a scanner and computer may be used to capture the image data, and then the computer may carry out the image processing and output the results locally. The image data and results may also be uploaded by the computer over a network to a central repository for storage and remote accessing.

In use, the user 166 inserts a test slide into the scanner 150 and the scanner captures one or more images of the test slide. The captured image data and any associated data, is then transferred over the communications link 170 to the computer 160 for storage and processing by a software application. The user 166 can enter various commands and/or data for the software application and the software application determines the quality of the stain and outputs an indication of the quality of the stain to the user 166. Various data items relating to the test slide currently being used, the stain, the user, the date and time, and similar may be stored in a database. The database may be local to the computer and/or may be remote to the computer 160. The computer 160 may be connected to a network via which data may written to and read from a remote data base hosted on a remote database server. The database may include a record for each test slide and each record may include a variety of fields for storing various data item relating to each individual test slide. The data obtained from the test slide and/or associated with the test slide may be stored in the database and/or output to the user 166. The stored data may be analysed and the result of such analysis stored in the database. The contents of the database may be retrieved for subsequent output and/or processing and/or export to other computers or storage devices.

Figure 7:
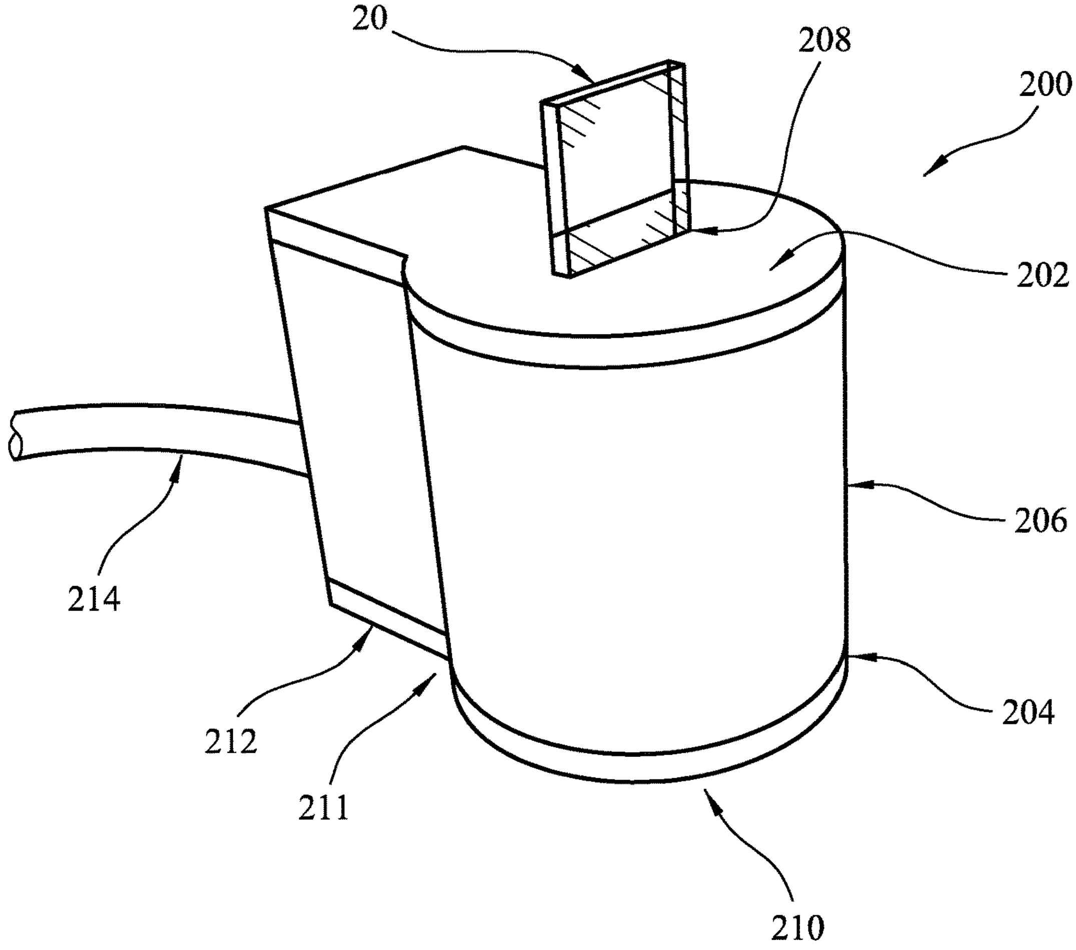
FIG. 7 shows a perspective view of a test slide scanner part of the data processing system shown in FIG. 6 and according to an aspect of the invention.

FIG. 7 shows a perspective view of an embodiment of a test slide scanner 200 according to the invention and which may be used as the scanner 150 of the stain QA system 140 illustrated in FIG. 6. The scanner 200 has a housing including a top part 202, a base 204 and a side wall 206. A rectangular slot 208 is defined in the top part 202 of the housing for receiving a test slide, e.g., test slide 20, as shown in FIG. 7. The housing defines a first generally circular cylindrical portion 210 and also a second generally rectangular portion 212. The first portion 210 defines a light integrating cylinder as described in greater detail below. The second portion 212 defines a volume for housing the image capture device and electronics as also described in greater detail below. A USB cable 214 extends from the rear of the scanner 200 and includes a USB connector (not shown) at a distal end for connecting the scanner to a USB port of the computer 160.

Figure 8:
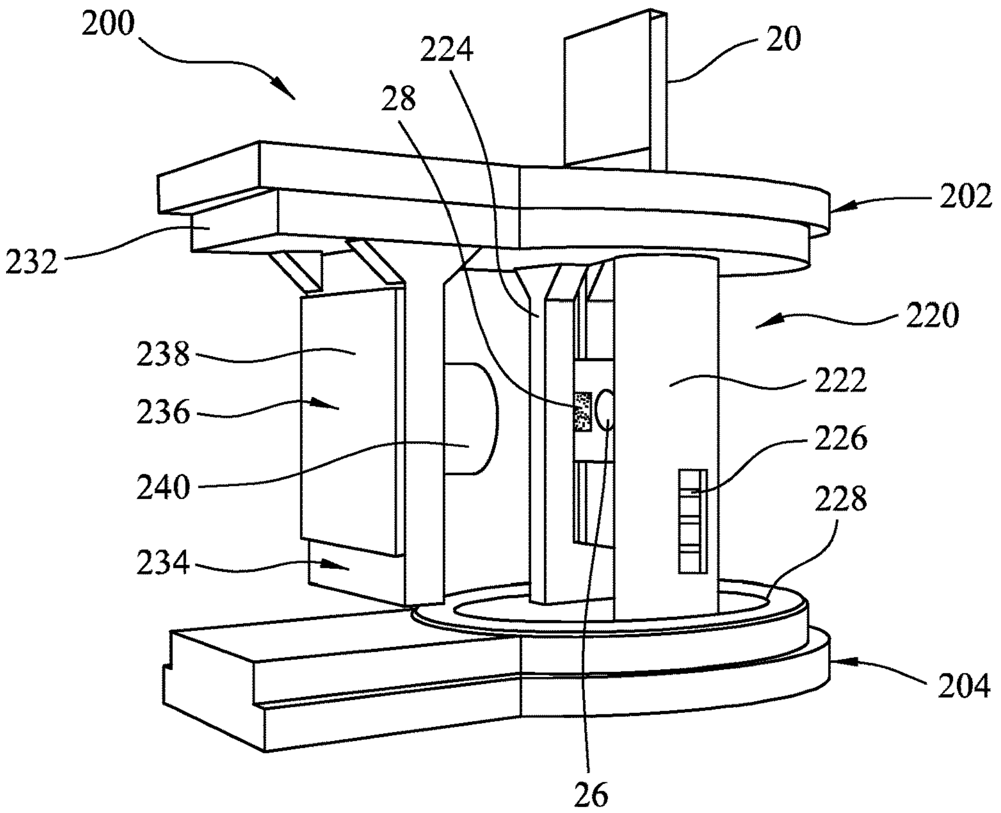
FIG. 8 shows a further perspective view of the test slide scanner shown in FIG. 7 with an outer casing removed.

FIG. 8 shows a perspective view of the test slide scanner 200 of FIG. 7, but with the side wall 206 removed, and illustrating the interior construction of the test slide scanner 200. The test slide scanner 200 has a main body 220 which has a generally unitary construction and which extends upward from the base 204. The top part 202 is releasably attachable to the main body 220 so that the side wall 206 can be slid onto the main body 220 like a sleeve and retained in place by the top part 202. A pair of legs 222, 224 extend upwardly from an upper portion of the base 204. Each leg includes a respective slot for slidingly receiving the test slide 20 in use. Each slot has a closed end positioned to limit the travel of the slide 20 into the test slide scanner so that the test patch 26 and machine readable code 28 are at the centre of the field of view of a camera 240.

A micro switch 226 is located in one leg 222 with an actuator extending into the recess of that legs so that the micro switch is operated when the test slide is slid into its final position within the test slide scanner at the limit of its travel.

An annular light source 228 is provided on an upper portion of the base and extends around the pair of legs 222, 224. The legs 222, 224 are positioned such that the test slide passes through the centre of the circle defined by the annular light source and corresponding to the axis defined by dashed line 230 in FIG. 9. The annular light source 228 may be in the form of an LED ring light.

An upper portion 232 of the main body 220 extends from the top of the pair of legs 222, 224 and generally parallel to the base 204 and with a generally similar shape as the base 204. A camera mount 234 extends downwardly from an under surface of the upper portion 232 and supports a camera module 236. The camera module includes the digital camera 240 and associated electronics mounted on a circuit board 238. The camera 240 is positioned so that the test patch 26 of the test slide is at the focal point of the lens of the camera so that the captured image of the test slide will generally be in focus. For example, a digital camera with a focal length of approximately 3.85 mm may be used. The digital camera may have an image sensor having at least 2 Mega pixels, although a greater number of pixels, e.g., 5 Mega pixels, provides better quality images.

The surface of the main body 220 of the test scanner is generally white so as to aid in the diffusive reflection of light from the annular light source 228 as described in greater detail below. The main body may be made from a white plastic, such as injection moulded ABS, or from painted metal, e.g., stainless steel painted white.

Figure 9:
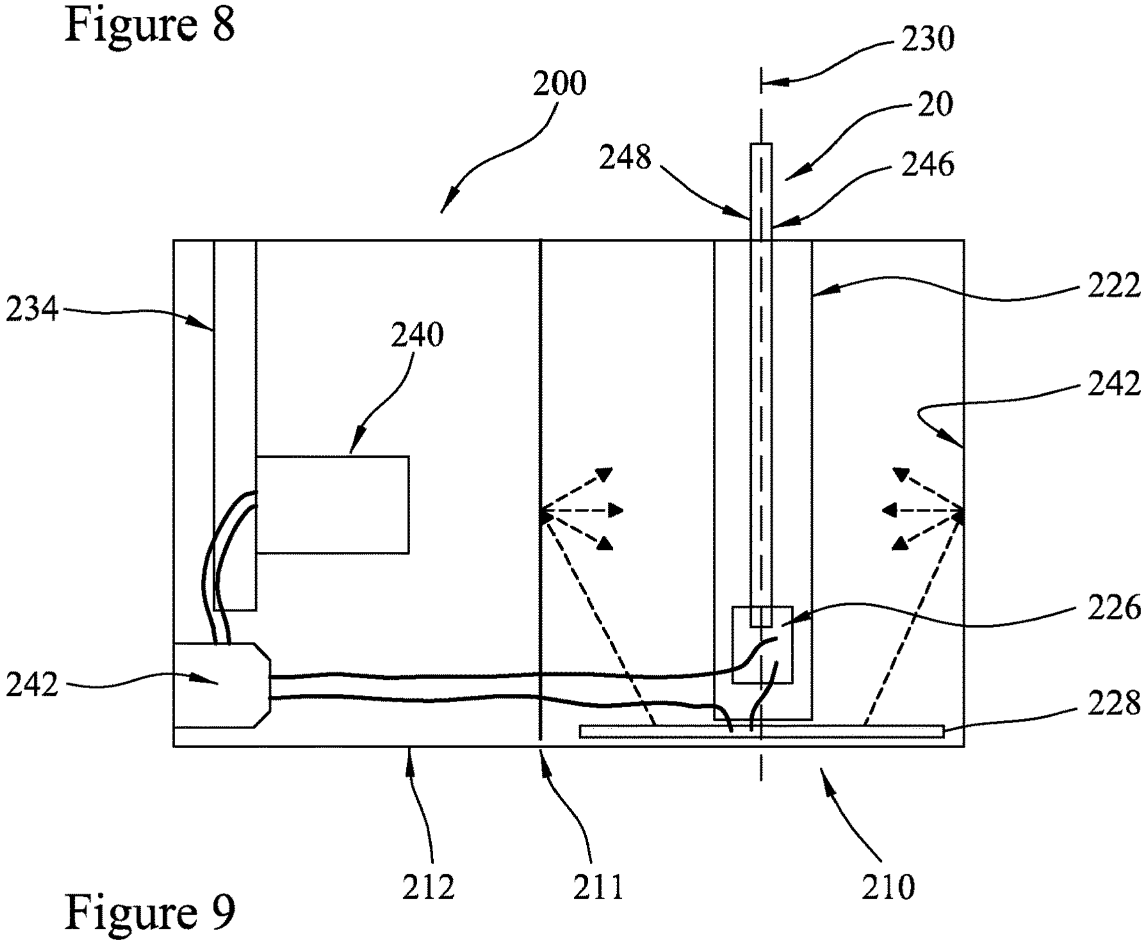
FIG. 9 shows a schematic cross section view of the test slide scanner shown in FIGS. 7 and 8.

FIG. 9 shows a schematic cross sectional view of the test slide scanner 200 along a longitudinal axis from the rear to the front of the test scanner. FIG. 9 also shows a USB connection 242 and wiring between the USB connection 242 and the camera module 236, wiring between the USB connection 242 and the annular light source 228 and also wiring between the micro switch 226 and the annular light source 228 and between the micro switch 226 and the USB connector 242. The USB cable can provide electrical power from the computer to the test slide scanner 200 to power the camera module and also the annular light source.

When the test slide 20 is slid into the test slide scanner to the limit of its travel, the edge of the test slide 20 contacts the actuator of the micro switch 226 to turn on the annular light source to illuminate the interior of the test slide scanner and may also turn on or control the digital camera module 236 to start capturing images of the test slide. The digital camera module then outputs frames of captured image data via the USB connector 242 and over the USB cable to the computer.

As noted above the first portion 210 of the test slide scanner is configured to act as a light integrating cylinder concentric with the centre of the annular light source and axis 230. The side wall 206 of the first portion 210 generally has the form of portion of a right circular cylinder up to 211 where the side wall develops into the side wall of the second portion 212. The inner surface, e.g., 242, of the side wall 206, is white and provides a generally diffusive reflective surface. Hence, the majority of the surface area within the test slide scanner diffusively reflects the light from the annular light source uniformly to help ensure that the test slide is generally uniformly illuminated. Also, the light integrating cylinder provided by the inner surface of the side wall of the first portion 210 helps to ensure that the test slide 20 is illuminated on both the rear and front faces. Hence, the light illuminating the rear 246 of the slide assists with imaging the test patch 26 by transmission and the light illuminating the front 248 of the slide assist with imaging the machine readable code 28 by reflection.

In embodiments in which the test slide 20 includes the three reference colour patches 32, 34, 36, then the camera can also capture an image of the three reference colour patches on the test slide by reflection of light off the front surface 248 of the test slide.

In other embodiments, in which the test slide does not include the three reference colour patches, then the three reference colour patches can be provided on a part of the test slide scanner 200 which is within the field of view of the camera 240. For example, the three reference colour patches may be provided on a part of one of the legs, 222, 224 adjacent the test patch 26 so that the image captured by the camera include the test patch 26, the machine readable code 28 and the three reference colour patches. In other embodiments the reference colour patches may be elsewhere on the test slide scanner provided that they can be imaged by the camera simultaneously with the test patch 26.

Figure 10:
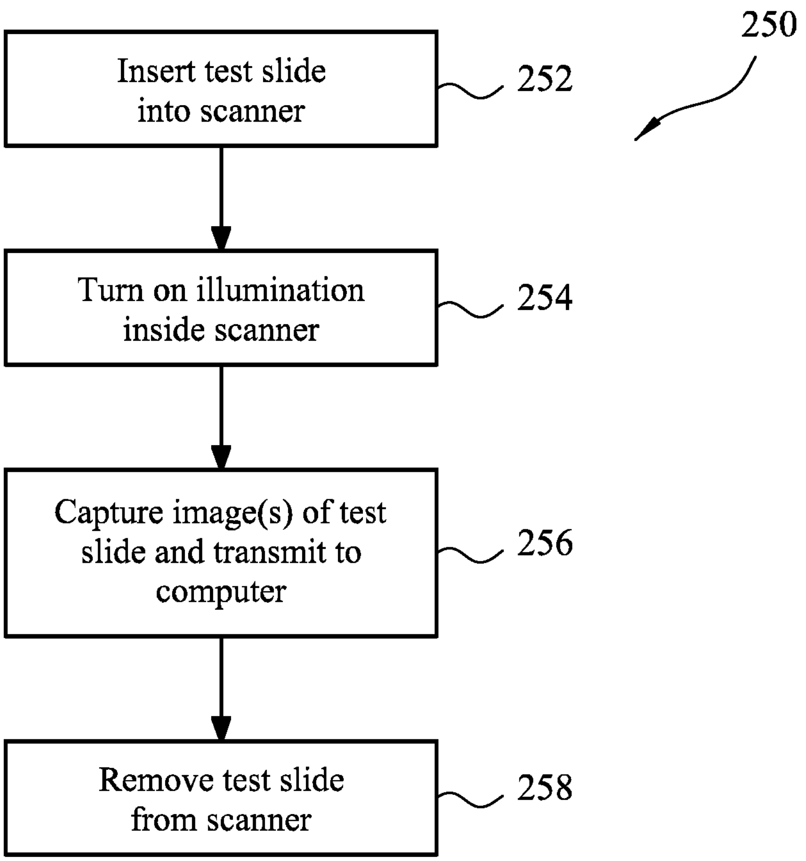
FIG. 10 shows a flow chart illustrating a method of using the test slide scanner illustrated in FIGS. 7 to 9 and according to an aspect of the invention.

FIG. 10 shows a flow chart illustrating a method of operation 250 of the test slide scanner 200 illustrated in FIGS. 7 to 9. At 252, the stained test slide 20 is inserted into the test slide scanner via the aperture 208 in the top part 202 with the front face 248 of the test slide facing toward the camera 240. The test slide is slid along the recesses in the legs 222, 224, and which locate the test slide 20 at the focal plane of the camera, until the test slide abuts the ends of the recesses which limit the test slide's travel. At the same time, the test slide operates the micro switch 226 to turn on the annular light source 228 at 254 to illuminate the rear and front surfaces of the test slide. Operation of the micro switch can also cause the camera to capture at least one image of the test slide at 256, including the stained test patch 26, the machine readable code 28 and the three reference colour patches (whether located on the test slide or on the test slide scanner itself). In some embodiments a single image may be captured at 256 and then transmitted to the computer over the USB cable. In other embodiments, the camera may capture a plurality of images at 256 and send the images to the computer over the USB cable.

Removal 258 of the test slide 20 deactivates the micro switch which turns off the annular light source and can also stop the camera from acquiring image data. Hence, in some embodiments, insertion and removal of the test slide may be used automatically to turn the illumination on and off and/or to start and stop image capture. This reduces the need for any external controls, such as switches, and hence the test slide scanner may be more suitable for use in a laboratory environment. This also make use of the test slide scanner simpler and more efficient and hence more likely to be used.

Although in principle there are several ways in which the QA test slide can be 'read', including whole slide imagers, colorimeters, spectrometers and cameras, each of these system has its own pros and cons. Therefore in considering the 'scanner' requirements the product design criteria need to be established around the product utility. The utility of this device is to allow QA test slides to be 'read' routinely in histopathology laboratories. Also, the test slides should be back lit for transmission reading through the biopolymer but at the same time the machine readable code needs to be imaged for traceability. Laboratories are often exceedingly busy, and often have a high turnover of staff, and therefore any disruption to operation needs to be kept to a minimum. Laboratories are also a relatively industrial environment so any design needs to be robust. The minimum data required to be derived from the QA test slide, the biopolymer patch LAB values, are relatively simple to obtain with any of the methods. However, more advanced analysis such as H/E ratio and homogeneity are difficult to obtain except for with a costly whole slide imaging (WSI) scanner with analytic software.

In arriving at the test scanner of the invention, the design criteria considered and provided by the test scanner of the invention, include: fast and easy to use by relatively novice staff; physically robust for the laboratory environment; minimal parts and low or no maintenance; ability to illuminate the front face and rear face of the test slide; low cost to aid adoption; and the ability to extract more complex information though software analysis.

The scanner of the invention is therefore a simple, dedicated, mini, USB based, desktop reader using a camera. When the slide is inserted into the reader the ring LED light source (or any light combination to balance between reflected and transmitted image ratio) is tuned on. The design uses an approximation to an integrating light sphere, which, with the ring LED (or other light source), provides cloud lighting with no reflections. The slide can be digitised using an off-the shelf camera focussed onto the slide region of interest. As all QA test slides are the same, no adjustment in the scanner will be required. The reflected image from the front face and the transmitted light through the biopolymer can both be recorded at the same time due to the 360% illumination. The diffuse nature of the light also reduces any reflections. The data is then preferably analysed on a personal computer, or transmitted over a network to a remote computer for analysis, rather than on the scanner device.

Figure 11A:
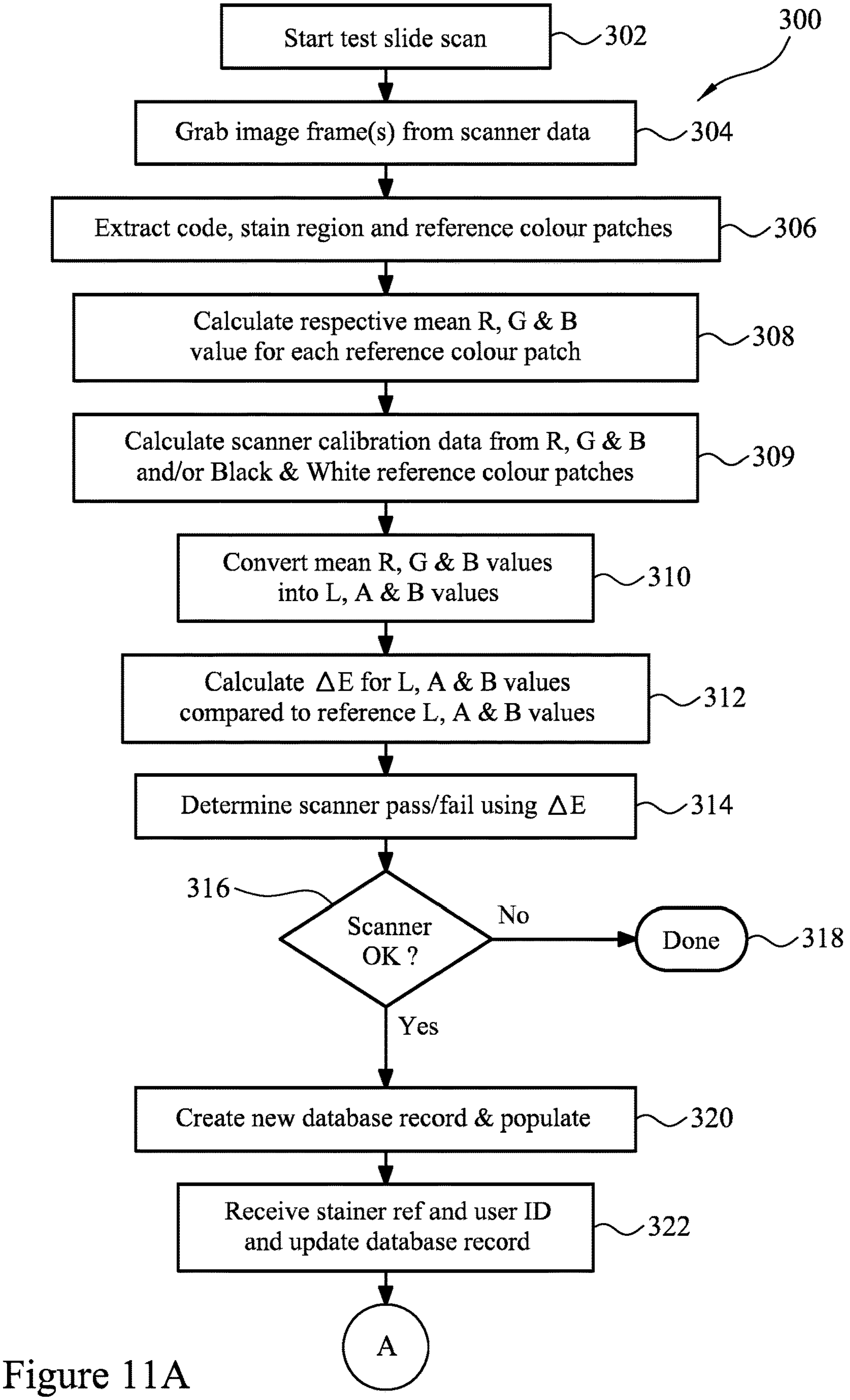
FIGS. 11A and 11B show a process flow chart illustrating a data processing method carried out by the data processing system shown in FIG. 6 and according to an aspect of the invention.
Figure 11B:
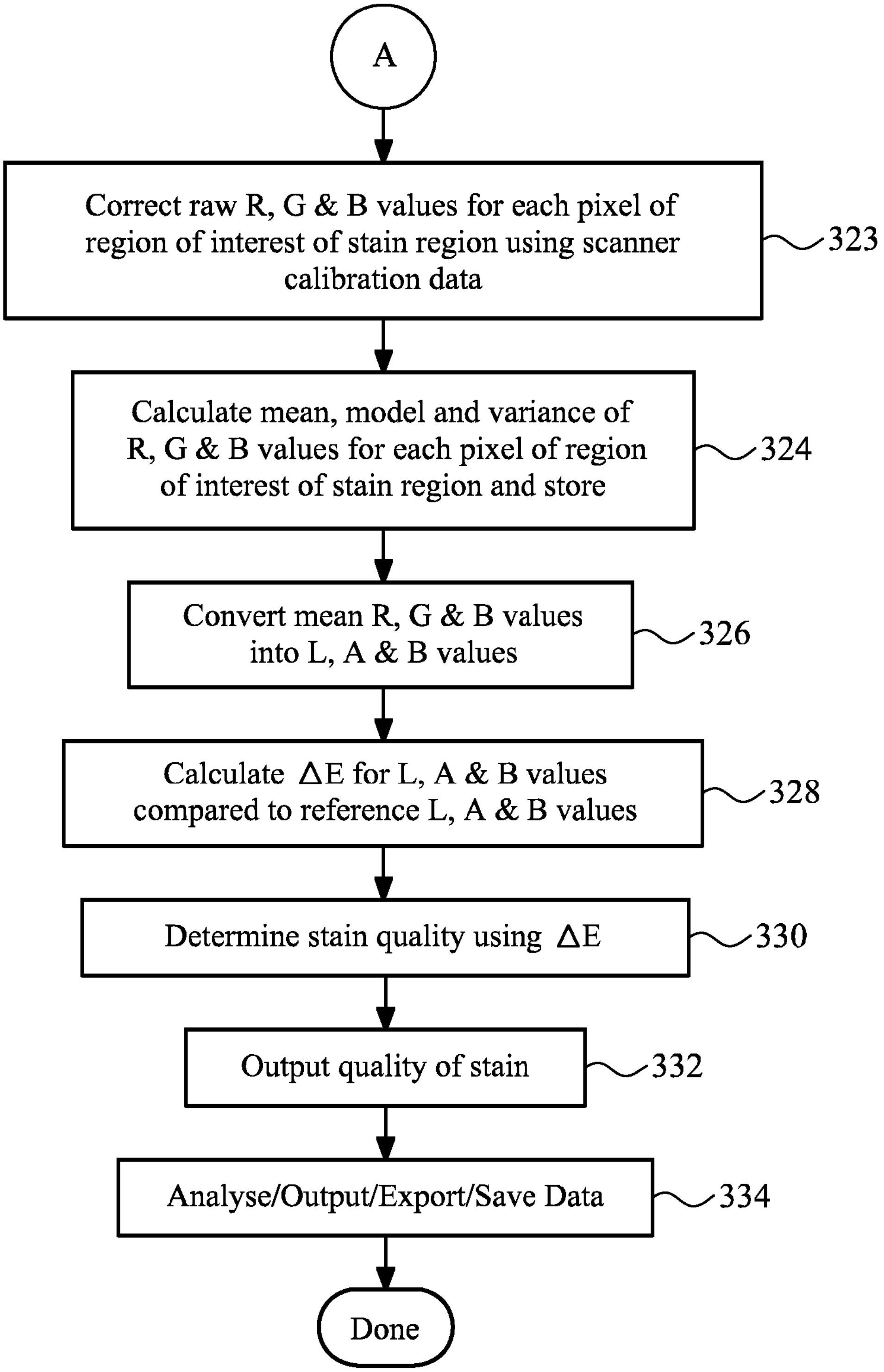

FIGS. 11A and 11B show a process flow chart illustrating a data processing method 300 according to the invention applied to the test slide images captured by the test slide scanner 200. The data processing method 300 may be implemented by a software application running on the computer 160 of the system 140 illustrated in FIG. 6 or in a unitary system in embodiments in which the data processing apparatus and scanner are combined.

At 302, the application is started or launched by the user 166 to start the test slide scan data acquisition. In some embodiments, the computer 160 may send a control signal to the scanner to control the camera to start image capture. In other embodiments, the computer simply starts to monitor the data being transmitted from the scanner to the computer over the data connection 170. At 304 the computer grabs at least one frame of image data from the scanner data being sent to the computer. Typically, the image frame data will comprise R, G and B values for each pixel of the image frame. In some embodiments, the computer may grab multiple frames of image data and average the values to help reduce any noise.

At 306, the parts of the image corresponding to the computer readable code 28, a central portion of the test patch 26 and the reference colour patches are extracted from the captured image. Image processing algorithms may be used to do this and/or regions of the test slide image may be pre-defined as the relevant parts of each test slide will have approximately the same position within the field of view of the camera, and hence captured imaged, when inserted in the test slide scanner. The machine readable code may be decoded by the software to obtain the unique identification number for the current test slide.

Also, at 306, black and white values for the captured image may be obtained. For example, a black value may be obtained from the part of the image including the computer readable code 28 if that has been printed in black ink. Alternatively, some other feature on the label may have been printed in black, for example a back colour patch adjacent reference colour patches 32, 34 & 36. Alternatively, a black coloured patch may be provided on a part of the interior of the scanner within the field of view of the camera. A white colour value may be captured from a portion of the label, such as a white patch adjacent the reference colour patches 32, 34, 36 or simply from the white background of the label, when the label is white.

In some embodiments, an aperture may be provided in the sticker or label and the white value may be determined from the part of the image of the light passing through that aperture.

In other embodiments, an opaque mask may be provided in the scanner behind the test slide and which defines an aperture, or apertures, co-incident with the test patch 38 or patches 56, 57. Hence, the mask prevents light passing through the test slide, other than through the test patch, and the white level may be set by an image of light reflected off the white label and not light transmitted through the white label.

The white and black values are used by the software to correct for any variation in the illumination in the scanner. The black and white points allow you to set the colour range, as white is all colour channels RGB at maximum level and black is all RBG values at minimum level. Hence, the white and black values can be used to set the upper and lower limits of all the colour channels. Also the red, green and blue values of the reference colour patches can be used by the software to set colour balance of the scanner, as opposed to colour range. Hence, the R, G and B values from black and white reference and the reference colour patches can be used to calibrate the scanner and to correct the measured image data.

At 308, a mean value for each of the red component, green component and blue component of all of the pixels of the red colour patch, a mean value for the red, component, green component and blue component of all of the pixels of the green colour patch and a mean value for the red component, green component and blue component of all of the pixels of the blue colour path are each calculated and stored. Also, a mean value for each of the red component, green component and blue component of all of the pixels of the white reference, and a mean value for the red, component, green component and blue component of all of the pixels of the black reference are each calculated and stored.

Figures 12, 13:
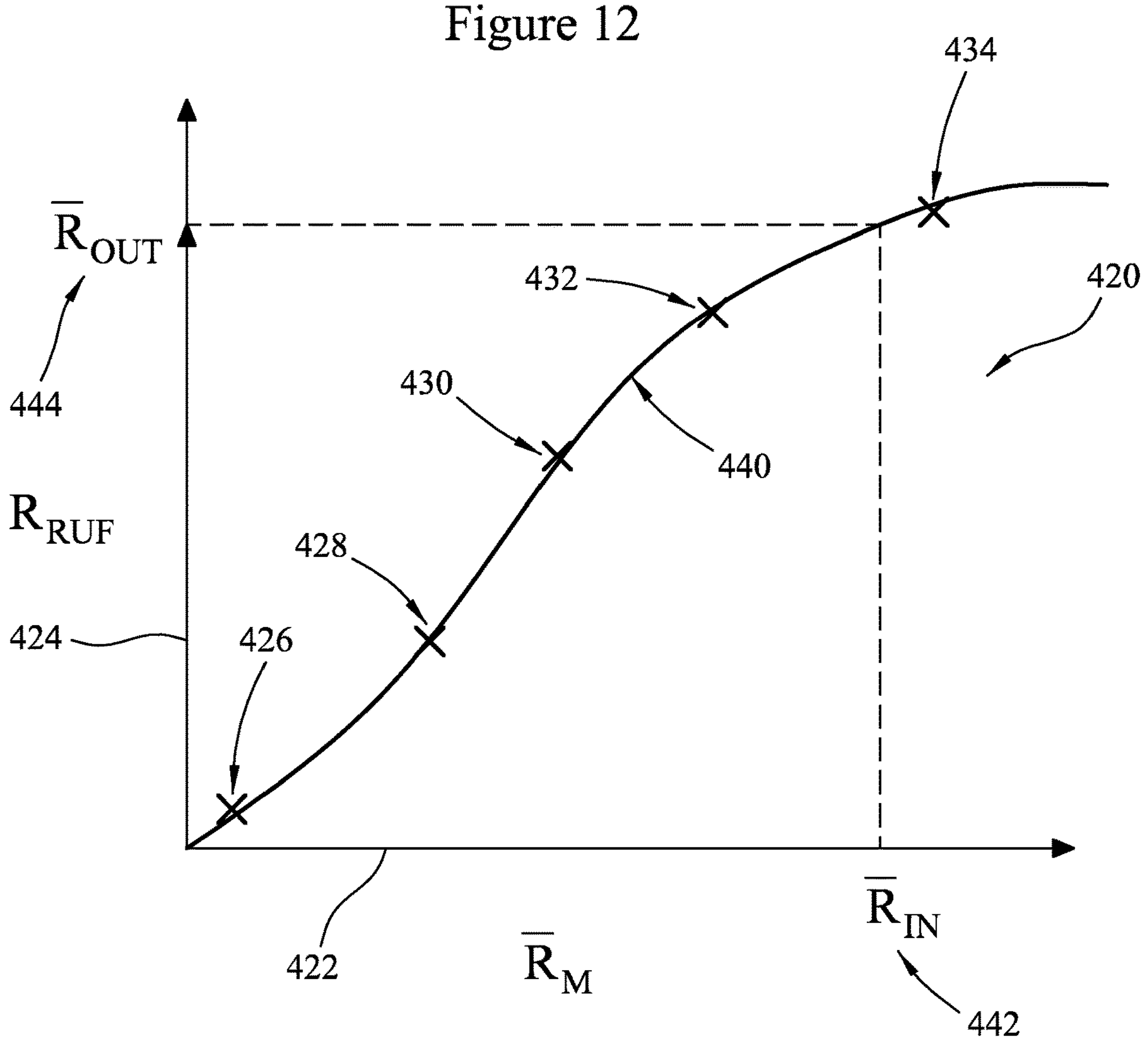
FIG. 12 shows a data structure used to stored measured reference colour data for scanner calibration.
FIG. 13 shows a graphical representation of a calibration function that may be used to correct raw colour data from a stain image region.

At 309, calibration data for the scanner is calculated as illustrated in more details with reference to FIGS. 12 and 13. The calibration data is then subsequently used to correct the R, G and B data for the stain images.

FIG. 12 shows a data structure 400 storing calibration data for the Red data and similar data structures are provided for each of the Green data and the Blue channel data. The red data is illustrated in FIG. 12 alone for simplicity and it will be appreciated that the Red, Green and Blue data may be provided in a common data structure. Data structure 400 stores data items permitting a calibration curve to be generated and which can be used to generate a calibration function or correction function which is then subsequently used to correct the R data for the stain image, and similarly for the G and B data. Data structure 400 encodes the relationship between a reference value for the R component of each of the Black, White, Red, Green and Blue reference colours 402 and the measured average value for the R component of each of the Black, White, Red, Green and Blue reference colours 404. The nomenclature in FIG. 12 is that the character indicates the colour channel, the superscript indicate the reference colour patch and the subscript indicates whether it is a measured value or a reference value. Hence, $R_{Ref}^{B}$ denotes the reference value for the red pixel component for the black reference colour patch. The reference values may have been determined using a colorimeter and hen previously stored in the data structure 400. The mean measured values have been determined at preceding step 308 and hence are stored in the corresponding fields of row 404. As noted above a corresponding data structure is provided for each of the R, G and B channels.

A plot of the data values from data structure 400 is illustrated in FIG. 13 which schematically shows a graphical representation 420 of the relationship between the mean measured values of Red, $R_M$ on axis 422, against the corresponding reference values, $R_{Ref}$ on axis 424, for each of the Black 426, Blue 428, Green 430, Red 432 and White 434 reference patches. A calibration function 440 can then be established form this data, and without actually needing to generate or display graph 420, by fitting a smooth line or curve, to the calibration data, for example using any commonly known regression technique, such as least squares fitting. The calibration function 440 may then be used subsequently to correct any measured value into an appropriately corrected value so that the comparison between separately captured images is more accurate. For example, a measured mean value of the Red pixel component for an image $R_{IN}$ 442 may be corrected using the calibration curve 440 to provide the corresponding corrected value $R_{OUT}$ 444 as output. While fitting a function to the calibration data may be preferred as providing a continuous correction function, in other embodiments a simpler approach would be simply to use interpolation between adjacent pairs of calibration data points which effective replaces the smooth function 440 with a sequence of functions, for example simple liner functions for a linear interpolation. A similar calibration function is determined for each of the red, green and blue data channels and stored for use subsequently to correct the captured stain image data into a common format more suitable for accurate comparison.

Hence, the R, G, B values for the Red, Green and Blue reference colour patches are used to establish a generally linear transformation in the captured images to compensate for any variation in the level of white light illumination between separate image captures.

The R, G, B values for the Black and White reference colours are used to establish the minimum (black) and maximum (white) end points of the colour response of the camera and hence effectively the scale between those end points.

The data correction is applied to the raw data and the RGB correction is made subsequently at step 323 before being converted to LAB values.

Then at 310 the mean values for the red component, green component and blue component are converted into corresponding values in an L, A and B colour space (in which L is a value for lightness, A is a value for a first colour component (green-red), and B is a value for a second colour component (blue-yellow)). In some embodiments, the CIELAB or CIE L*a*b* colour space may be used. Then at 312 a measure of the difference between the measured L, A and B values and reference L, A & B values is calculated. For example, a value of ΔE can be calculated, which is essentially a measure of the distance in the LAB colour space between the measured L, A and B values and the reference L, A and B values. A value of ΔE of less than approximately 1 corresponds to a difference in colour which is not perceptible to humans, and which in practice maybe up to less than approximately 2.

At 314 the calculated value of ΔE is used to determine whether the scanner is measuring colour sufficiently reliably. For example the calculated value of ΔE may be compared to a threshold value, for example a threshold value in the range of about 2 to 5 ΔE, to determine whether the scanner is measuring colour sufficiently reliably. If it is determined at 316, that the scanner is not operating correctly, then the method may end at 318 and the data may be discarded or at least not written to the database of test slide scan data. If at 316 it is determined that the scanner is measuring colour sufficiently well, then processing proceeds to 320 at which a new record in the database of test slide scan data is created. The new record includes the unique identifier for the current test slide as decoded form the machine readable code previously. Various other data items may also be written to the record for the current test slide such as some or all of the data associated with the test slide when it was manufactured and as described above with reference to FIG. 4.

At 322 the software application may prompt the user 166 to enter a stainer reference which identifies the stainer, i.e., the person that did the staining, and a user identifier for the user 166 so as to record which user is carrying out the stain QA method, and the database record for the current test slide is updated.

At 323, the raw R, G, B values for each pixel of the stain region are converted using the calibration or correction function 440 determined and stored previously at step 309, and the corrected R, G, B values are stored for subsequent processing. This helps to remove artefacts arising from the level of white light illumination and/or colour response of the camera. In the following, it is the corrected or calibrated values of R, G and B that are used.

At 324, the software application calculates various statistical measures of the corrected red, green and blue colour components of the extracted part of the captured image corresponding to a central portion of the test patch. A mean value, model value and variance of each of the corrected red component, corrected blue component and corrected green component for all of the pixels of the extracted part of the image corresponding to the central portion of the test patch is calculated and may be stored in the database record for the current test slide. Then at 328 the mean values for the red, green and blue components are converted into corresponding values for L, A and B in an LAB colour space, in a similar manner to that described above. Then at 328 a value for ΔE is calculated using the L, A and B values for the test patch for the current test slide and stored reference values for L, A and B for a test patch that has been stained using an ideal stain. Hence, the value of ΔE calculated at 328 gives a quantitative measure of the difference in colour between the test patch stained using the current stain and a similar test patch stained using an ideal stain.

Then at 330, the value of ΔE can be used to determine the current quality of the current stain. For example, ΔE may simply be compared with a threshold value to determine whether the satin is acceptable or not. For example a value of ΔE less than 25 may be indicate that the stain is still acceptable whereas a value of ΔE greater than 25 may indicate that the stain is no longer acceptable. In other embodiments ranges of values may be used to discriminate between differences in quality of the stain rather than a simple pass fail. For example a value of ΔE less than 5 may correspond to the quality of the stain being good quality, a value of ΔE greater than 5 and less than 15 may correspond to the quality of the stain being acceptable quality, and a value of ΔE greater than 15 may correspond to the quality of the stain being unacceptable.

Hence, at 332 an indication of the quality of the stain may be output to the user 166. The user may then take action to replace or refresh the stain as appropriate and as described above with reference to FIG. 5. The quality of the stain for the current test slide is then written to the database record for the current test slide together with the time of the current test.

At 334, the stored data may be analysed or output or exported or saved for other uses. For example, the stored data for may be analysed to detect changes in the stain quality as a function of time so that the stain can be changed before it actually becomes unacceptable. For example, if the stain qualities for the last four tests at two hour intervals were good, good, acceptable, acceptable, then it may be determined that the stain is likely to become unacceptable before the next test slide is stained in two hours' time. Hence, at 332, although the current stain quality is determined to be acceptable, at 332 the output may indicate that the current stain quality is acceptable, but that the stain is failing and will soon become unacceptable and therefore should be replaced pre-emptively now. Hence, this can help to reduce the staining of sample slides using a stain which is no longer acceptable.

Generally, embodiments of the present invention, and in particular the processes involved in processing the test slide images involve data processed by, stored in and/or transferred through one or more computers. Embodiments of the present invention also relate to one or more data processing apparatus for performing these operations. The or each apparatus may be specially constructed for the required purposes, or it may be a general-purpose computer selectively activated or reconfigured by a computer program and/or data structure stored in the computer. Various general-purpose machines may be used with programs written in accordance with the teachings herein, or it may be more convenient to construct a more specialized apparatus to perform the required method steps. A particular structure for a variety of these machines will apparent to a person of ordinary skill in the art from the description given herein.

In addition, embodiments of the present invention relate to computer readable media or computer program products that include program instructions and/or data (including data structures) in non-transitory form for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Hence, various methods and apparatus have been described which can be used to provide a method of stain quality assurance that allows routine testing and quantification of stain quality, and which is particularly suitable for haematoxylin and eosin, which is used in over 90% of applications. The stain QA method requires the test slide to be stained in exactly the same way as a clinical sample slide and may then analysed be in a purpose built reader. The test slide contains at least one test patch that uptakes stain proportionally to tissue but are of a known thickness so any variation can be measured and tracked. Reference colour swatches can also be imaged to allow for colour calibration. If the stain quality is outside of the control parameters, then an operator is alerted and the stain can be refreshed. This method can also be used in laboratory accreditation through national accreditation frameworks with centralised monitoring of laboratory stain quality.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Any instructions and/or flowchart steps can be executed in any order, unless a specific order is either explicitly stated or required by the context. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

The invention claimed is:

1. A quality assurance (QA) test slide for use in a stain QA method for a stain, the QA test slide comprising:

a transparent substrate;

a piece of biopolymer material disposed on the transparent substrate; and a sticker defining an aperture and adhered to the transparent substrate over the piece of biopolymer material so that the sticker secures the piece of biopolymer material to the transparent substrate, a portion of the piece of biopolymer material being exposed by the aperture with the sticker completely encircling the portion of the piece of biopolymer material that is exposed, and wherein a machine readable code is borne by the sticker and the machine readable code encodes a unique identifier for the QA test slide.

2. The QA test slide as claimed in claim 1, wherein the transparent substrate is a microscope slide.

3. The QA test slide as claimed in claim 1, wherein the sticker further bears a first, a second and a third reference colour patch, and wherein each reference colour patch is a different colour.

4. The QA test slide as claimed in claim 1, wherein the sticker further bears a traceability code.

5. The QA test slide as claimed in claim 1, wherein the machine readable code is a QR code.

6. The QA test slide as claimed in claim 1, wherein the biopolymer material has a thickness in the range of 1 to 40 microns.

7. The QA test slide as claimed in claim 1, wherein the biopolymer material is cellulose.

8. The QA test slide as claimed in claim 1, wherein the aperture has a dimension of between 2 cm and 0.5 cm.

9. The QA test slide as claimed in claim 1, wherein the stain is haematoxylin and eosin (H&E) and the piece of biopolymer material is responsive to H&E.

10. The QA test slide as claimed in claim 1, and further comprising:

a further piece of biopolymer material mounted on the transparent substrate, wherein the sticker defines a further aperture and is adhered to the transparent substrate over the further piece of biopolymer material and with a portion of the further piece of biopolymer material exposed by the further aperture and wherein the piece of biopolymer material is responsive to a first stain and the further piece of biopolymer material is responsive to a second stain.

11. The QA test slide as claimed in claim 10, wherein the piece of biopolymer material is responsive to Haematoxylin and the further piece of biopolymer material is responsive to Eosin.

12. The QA test slide as claimed in claim 10, wherein the aperture and the further aperture each has a dimension between 1.5 cm and 0.5 cm.

13. The QA test slide as claimed in claim 10, wherein the piece of biopolymer material and the further piece of biopolymer material has a dimension of between 2 cm and 0.5 cm.

14. The QA test slide as claimed in claim 1, wherein the piece of biopolymer material has been stained by the stain which is being, or is going to be, used to stain sample slides.

15. A method of making QA test slides for use in a stain QA method for a stain, the method comprising:

cutting a plurality of pieces of biopolymer material from a sheet of biopolymer material;

fixing a test piece of the plurality of pieces of biopolymer material to a microscope slide;

staining said test piece using a freshly made batch of the stain;

determining whether a colour of the stained test piece is sufficiently similar to a reference colour;

fixing those of the plurality of pieces of biopolymer material cut from a region of the sheet associated with the test piece to a transparent substrate of a respective microscope slide when the colour of the stained test piece is sufficiently similar to the reference colour to form a plurality of QA test slides;

assigning a unique reference to each of the plurality of QA test slides; and adhering a respective sticker, defining an aperture therein, to the transparent substrate of each corresponding respective microscope slide and over the piece of biopolymer material fixed to the transparent substrate of the corresponding respective microscope slide so that the sticker secures the piece of biopolymer material to the transparent substrate, a portion of the piece of biopolymer material being exposed by the aperture with the sticker completely encircling the portion of the piece of biopolymer material that is exposed, and wherein a machine readable code is borne by the sticker and the machine readable code encodes the assigned unique reference for each QA test slide.

16. The method of claim 15, further comprising:

storing each QA test slide in a respective container.

17. The method of claim 16, wherein each container is an opaque container.

18. The method of claim 16, wherein each container includes a desiccant.

19. The method of claim 16, wherein the container includes an external traceability label.

20. The method of claim 15, wherein a spectrophotometer is used to determine whether the colour of the stained test piece is sufficiently similar to a reference colour.

21. The method of claim 15, further comprising:

cutting the sheet of biopolymer material from a production line piece of biopolymer material.

22. The method of claim 15, wherein the plurality of pieces of biopolymer material comprises a plurality of groups of pieces, and wherein:

a test piece from each group is fixed to a respective microscope slide;

each of said test pieces is stained using the freshly made batch of the stain;

whether the colour of each of the stained test pieces is sufficiently similar to a reference colour is determined; and the rest of the pieces of the group are fixed to a respective microscope slide if the colour of the stained test piece from the group is sufficiently similar to the reference colour, for each of the plurality of groups.

23. The method of claim 22, wherein each group of pieces comprises a plurality of pieces that have been cut from a different position within a row of positions of the sheet.

24. The method of claim 23, wherein each different position is a different column.

25. The method of claim 15, wherein the stain is H&E.

26. The method of claim 15, wherein the biopolymer material has a thickness in the range of 1 to 40 microns.

27. The method of claim 15, wherein the biopolymer material is cellulose.

28. The method of claim 15, wherein determining whether the colour of the stained test piece is sufficiently similar to a reference colour includes:

measuring the colour of the stained test piece; and calculating a value for $\Delta E$ from the measured colour of the stained test piece and the reference colour.

29. The method of claim 28, wherein the colour of the stained test piece is determined to be sufficiently similar to a reference colour if the value for $\Delta E$ is not greater than one.

30. The QA test slide as claimed in claim 1, wherein the sticker defines a further aperture arranged to permit the transmission of white light through the QA test slide.

31. The QA test slide as claimed in claim 1, wherein the piece of biopolymer material has an outer perimeter edge and the sticker extends outwardly beyond the outer perimeter edge so that the sticker completely encircles the outer perimeter edge.

* * * * *